United States Patent Office 3,478,052
Patented Nov. 11, 1969

3,478,052
IMIDO PERHALOALKYL DISULFIDES
Bob L. McCaskey, San Pablo, Gustave K. Kohn, Berkeley, and Joseph E. Moore, Richmond, Calif., assignors to Chevron Research Company, San Francisco, Calif., a corporation of Delaware
No Drawing. Original application Jan. 6, 1965, Ser. No. 423,819, now Patent No. 3,356,572, dated Dec. 5, 1967. Divided and this application Apr. 20, 1967, Ser. No. 642,275
Int. Cl. C07d 27/52; A61k 27/00
U.S. Cl. 260—326    8 Claims

ABSTRACT OF THE DISCLOSURE

Imidoperhaloalkyl disulfides in which the alkyl group is methyl or ethyl, the halogens are chlorine or bromine and the imido group may be phthalimido or tetrahydrophthalimido. An exemplary disulfide is phthalimido perchloroethyl disulfide. These disulfides are useful for tranquilizing laboratory animals such as rodents.

---

This application is a divisional of copending application Ser. No. 423,819, filed Jan. 6, 1965 and now U.S. Patent No. 3,356,572, which is a continuation-in-part of abandoned applications Ser. No. 141,289 and Ser. No. 141,290, both filed Sept. 28, 1961.

This invention relates to novel disulfides. In particular, it relates to a novel class of imido perhaloalkyl disulfides which are of particular value for tranquilizing laboratory animals.

In biological and bacteriological research, much use is made of laboratory animals, particularly rodents, e.g., rats and mice, because of their relatively low cost. A good many of these animals, however, are extremely active and in some instances even dangerous. For example, many of the types of large rats used in medical schools for various experiments are prone to biting or attempting to bite anyone who tries to handle them. Furthermore, these rats will make all efforts to avoid handling. Because of these tendencies, it is of great advantage to keep the rats in a tranquil or semitranquil condition in order to avoid the inconvenience and danger which otherwise would be present.

It has now been found that novel imido perhaloalkyl disulfides tranquilize animals and at the same time reduce their body temperature, inducing a condition known as hypothermia. Surprisingly, analogous compounds containing the monosulfide and thiooxy linkages showed no evidence whatsoever of tranquilizing effect.

Particularly, the novel compounds of this invention are imido perhaloalkyl disulfides wherein the imido group is selected from the class consisting of phthalimido and tetrahydrophthalimido, the halogens of the perhaloalkyl group are of atomic number 17 to 35 and the alkyl of the perhaloalkyl group has from 1 to 2 carbon atoms. The halogens of the novel disulfides may be the same or different.

Structurally, the novel disulfides may be represented by the formula

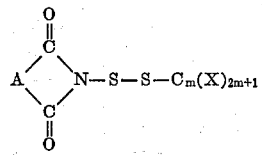

In the above formula, $m$ is an integer from 1 to 2, X represents halogens of atomic number 17 to 35 and A is a 1,2-carbocyclic group having 6 annular carbons and from 1 to 3 sites of olefinic unsaturation. The halogens represented by X may be the same or different.

The unique compounds of this invention are produced according to the following generalized method of preparation. Preferably, the preparation of any imido perhaloalkyl disulfide is accomplished by the reaction of an alkali metal salt of the corresponding imide, i.e., phthalimide or tetrahydrophthalimide, with a perhaloalkylthiosulfenyl halide, i.e., chloride or bromide.

The method of preparation of any particular imido perhaloalkyl disulfide generally comprises the addition of a perhaloalkylthiosulfenyl halide, preferably, perchloroalkylthiosulfenyl chloride, to a vigorously stirred aqueous solution of the alkali metal salt of the corresponding imide and ice. The perhaloalkylthiosulfenyl halide may be contained in a suitable inert solvent, such as petroleum ether or mixed hexanes. A solid forms in this reaction which is filtered, water-washed, and air-dried. This solid consists of the desired product and may be recrystallized from a solvent, such as methanol or mixed hexanes, if desired.

Variations on this procedure may be made. Accordingly, the alkali metal imide salts may be formed in situ by dispersing the corresponding imide directly into the organic media in which there has been admixed a finely divided alkali metal hydroxide or alkali metal.

As illustrations of the novel compounds of this invention and their method of preparation, the following examples are presented.

EXAMPLE 1

A mixture of 100 ml. of water, 100 g. of ice, and 9.25 g. of potassium phthalimide was vigorously stirred while 11.5 g. of perchloromethylthiosulfenyl chloride diluted with an equal volume of hexanes was added. 17 g. of a white solid separated and was filtered, water-washed and air-dried. A portion recrystallized from methanol melted at 132°–134° C. and was analyzed to be phthalimido perchloromethyl disulfide. Calculated: S, 19.5%. Found: S, 19.0%.

EXAMPLE 2

A mixture of 100 ml. of water, 100 g. of ice, 2.0 g. of sodium hydroxide, and 7.5 g. of tetrahydrophthalimide was vigorously stirred while 10.9 g. of perchloromethylthiosulfenyl chloride diluted with an equal volume of hexanes was added. A white solid separated which was filtered, water-washed and air-dried. Recrystallization from methanol gave a white solid melting at 84°–85° C. which was analyzed to be tetrahydrophthalimido perchloromethyl disulfide.

Calculated: Cl, 32.0%; S, 19.3%. Found: S, 32.0%; Cl, 19.4%.

EXAMPLE 3

A mixture of 100 ml. of water, 100 g. of ice, and 4.5 g. of potassium phthalimide was vigorously stirred while 6.0 g. of bromodichloromethylthiosulfenyl chloride diluted with an equal volume of petroleum ether was added. A white solid separated which was filtered, water-washed and air-dried. Recrystallization from methanol gave a white solid melting at 131°–138° C. which was analyzed to be phthalimido bromodichloromethyl disulfide. Calculated: Cl, 19.0%; Br, 21.4%. Found: Cl, 19.2%; Br, 19.0%.

Tetrahydrophthalimido bromodichloromethyl disulfide and tetrahydrophthalimide chlorodibromo disulfide were also prepared in the above manner.

EXAMPLE 4

A mixture of 100 ml. of water, 100 g. of ice, and 20.6 g. of potassium phthalimide was vigorously stirred while 30.0 g. of perchloroethylthiosulfenyl chloride diluted with an equal volume of hexanes was added. A white solid separated and was filtered, water-washed and air-dried. A portion recrystallized from methanol melting at 133°–135° C. and was analyzed to be phthalimido perchloroethyl disulfide. Calculated: Cl, 43.2%. Found: Cl, 43.8%.

EXAMPLE 5

A mixture of 100 ml. of water, 100 g. of ice, 3.6 g. of sodium hydroxide, and 11.2 g. of tetrahydrophthalimide was vigorously stirred while 20 g. of perchloroethylthiosulfenyl chloride diluted with an equal volume of hexanes was added. A white solid separated which was filtered, water-washed and air-dried. Recrystallization from hot, mixed hexanes gave a white solid melting at 100°–103° C. which was analyzed to be tetrahydrophthalimido perchloroethyl disulfide. Calculated: Cl, 42.7%; S, 15.4%; N, 3.37%. Found: Cl, 42.7%; S, 14.6%; N, 3.24%.

The compounds of this invention have been found to possess tranquilizing properties as indicated by their unusual effectiveness in the reduction of normal activity in laboratory animals. As such, they may be used, along with known pharmaceutically acceptable carriers, if desired, to lessen the degree of activity of laboratory animals, particularly rodents, so as to avoid weight loss, facilitate ease of handling, or the like. The compounds may be employed either alone or in admixture with other biologically or pharmaceutically active compounds to achieve a tranquilizing effect, such as the production of ataraxia in states of hyperirritability. These compounds have been found of particular advantage upon rodents to be employed for various medical or bacteriological tests carried on in medical schools and experimental centers. The compounds of this invention, when administered to the rodents along with a suitable carrier, if desired, lessen to a great extent their activity, and hence leave the animals in a relaxed state, making them easy to handle, much less dangerous, and avoiding their usual nervous anxiety.

The dosage of tranquilizing compound required will vary according to the particular carrier used, the size of the animal, and the degree or duration of dormancy, relaxation and/or tranquilization desired. This dosage varies from about 25 to 1000 mg., tranquilizing compound per kilogram weight of animal. However, high dosages are not generally recommended as the recovery of the animals so inoculated tends to be nonuniform.

The compounds may be administered by themselves, or in a tranquilizing agent comprising the compound admixed with a pharmaceutically acceptable carrier therefor. These tranquilizing agents may take the form of an aqueous suspension of the compound in a suitable suspending agent, such as carboxymethyl-cellulose or acetone. They may also take the form of a solution of the compound in a suitable solvent, such as acetone or peanut oil. Peanut oil solutions are preferred because the tranquilizing effect, using the invention compounds, is very rapidly achieved in this medium. About 0.1 to 1 cc. of peanut oil is preferable, although up to 5 cc. or more may be employed with larger animals.

The tranquilizing agents of the invention may be administered in many ways, all of which provide a substantial amount of the compound in the animal bloodstream. A particularly practical and accepted means of administering the compounds to the animals is by oral administration. This means has been employed with essentially uniform success. Of course, other means such as intravenous, intraperitoneal and rectal injection are equally effective and may be used if desired.

The following examples illustrate the tranquilizing properties of the novel compounds of this invention.

EXAMPLE 6

Tetrahydrophthalimido perchloromethyl disulfide was suspended in acetone to facilitate its administration to animals. This suspension was orally administered to eight Long-Evans rats weighing about 150 grams apiece at dosages of 100 mg. tetrahydrophthalimido perchloromethyl disulfide per kilogram weight of rat. Each rat was observed for tranquilizing effect which was evaluated on the basis of the overall tranquility of the animal, response to handclap, response to blowing and nesting activity. Within three hours after administration, seven out of the eight were completely tranquilized. The eighth rat died. An autopsy on the dead rat indicated that it had died from extraneous causes. After about 72 hours, the seven tranquilized rats had resumed normal activity.

EXAMPLE 7

In the same manner as described in Example 6, tetrahydrophthalimido bromodichloromethyl disulfide was suspended in acetone and orally administered to rats weighing between 125–150 grams apiece at dosages of 250 mg./kg. weight of rat and at 1000 mg./kg. weight of rat (five rats at each dosage). The rats treated with the 250 mg./kg. doses were significantly tranquilized as evidenced by their overall tranquility, response to handclap and blowing and nesting acitvity. The rats treated with the 1000 mg./kg. doses were almost completely tranquilized.

EXAMPLE 8

Tetrahydrophthalimido perchloromethyl disulfide was suspended in peanut oil to facilitate its administration to animals. This suspension was injected into the peritoneum of ten white mice weighing between 20 to 25 grams apiece at dosages of 37.5 mg./kg. weight of mouse. After a short period of time, a pronounced dormancy was observed in all of them, along with a huddling tendency and an inward pinching of their stomachs. Manifestations of this dormancy continued for a considerable period of time, in excess of a few hours. Appreciable hypothermia was also observed.

EXAMPLE 9

In the manner described in Example 8, phthalimido perchloromethyl disulfide was administered to ten white mice weighing between 20–25 grams apiece at 50 mg./kg. weight of mouse. Essentially the same results were observed as in Example 8.

EXAMPLE 10

Tetrahydrophthalimido perchloroethyl disulfide was suspended in peanut oil to facilitate its administration to animals. This suspension was injected into the peritoneum of each of three white mice weighing between 20–25 grams apiece in doses of 50 mg./kg. weight of mouse. After a short period of time, a lessening of activity was observed in all of them, along with yawning, stretching and a struggling to utilize their hindquarters. Manifestations of this dormancy continued for a considerable period of time.

For comparative purposes, analogous compounds containing the monosulfide and thioxy linkages were tested for tranquilizing properties. The following examples show that these compounds do not possess tranquilizing properties.

EXAMPLE 11

The trichloromethylsulfenic ester of phthaloximide prepared as described in U.S. Patent No. 2,846,442 was suspended in acetone to facilitate administration to the animals. This suspension was orally administered to five Sprague-Dawley rats weighing from 125–130 grams in doses of 500 mg. of the ester per kilogram weight of rat. After the administration, the rats were observed by three separate observers for avoidance reactions, startling reactions, escape attempts and general activity. These individual observations were conducted six times during a 6-hour period and then again after 24 and 48 hours. No evidence of any tranquilizing effect was observed.

EXAMPLE 12

N - trichloromethylthiophthalimide was suspended in acetone to facilitate its administration to animals. This suspension was orally administered to five Sprague-Dawley rats weighing about 150 grams apiece in doses of 1000 mg. N-trichloromethylthiophthalimide per kilogram weight of rat. After administration, the rats were observed in the same manner as described in Example 11. No evidence of any tranquilizing effect was observed.

We claim:
1. A compound of the formula

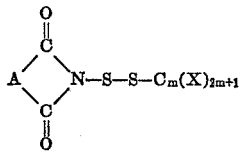

wherein $m$ is an integer from 1 to 2, X represents halogens of atomic number 17 to 35 and A is 1,2-phenylene or 1,2-tetrahydrophenylene.

2. The disulfides of claim 1 wherein $m$ is 1.
3. The disulfides of claim 1 wherein $m$ is 2.
4. Phthalimido perchloromethyl disulfide.
5. Tetrahydrophthalimido perchloromethyl disulfide.
6. Phthalimido bromodichloromethyl disulfide.
7. Phthalimido perchloroethyl disulfide.
8. Tetrahydrophthalimido perchloromethyl disulfide.

References Cited

FOREIGN PATENTS 779,114  7/1957  Great Britain.

OTHER REFERENCES

Conant, The Chemistry of Organic Compounds (1947), p. 342.

ALEX MAZEL, Primary Examiner

J. A. NARCAVAGE, Assistant Examiner

U.S. Cl. X.R.

424—274